United States Patent [19]

Rogers

[11] 3,752,441
[45] Aug. 14, 1973

[54] VEHICLE WHEEL ELEVATING AND LEVELING DEVICE

[76] Inventor: John E. Rogers, 2266 Avon Ave. S.W., Camden, Ark. 71701

[22] Filed: Oct. 20, 1971

[21] Appl. No.: 190,829

[52] U.S. Cl. .................................................. 254/88
[51] Int. Cl. .............................................. E02c 3/00
[58] Field of Search ...................... 254/88; 248/346, 248/352

[56] References Cited
UNITED STATES PATENTS
2,272,334 2/1942 Laurent .............................. 254/88
3,295,829 1/1967 Tarr ..................................... 254/88

Primary Examiner—Othell M. Simpson
Assistant Examiner—Robert C. Watson
Attorney—Harvey B. Jacobson

[57] ABSTRACT

A wheel elevating, leveling and chocking device useful as (1) a lift and (2) a scotch (chock) for a camper wheel. It is of elongated stepped construction in that it embodies several step-like sections which are oriented in end-to-end alignment, are telescopingly united, and can be extended for ramp-like use and alternatively retracted and collapsed. The sections are hollow and block-like and are capable of being telescoped and compactly collapsed for convenient handling and storage. Each section is basically alike in that it comprises a vertically walled base portion providing a riser and a top horizontal wall or platform constituting a wheel seating tread. The thus oriented steps can be selectively individually used for ascending and descending requirements. The flanged bottom portions can be nested and stacked or extended into flush relationship at will.

7 Claims, 6 Drawing Figures

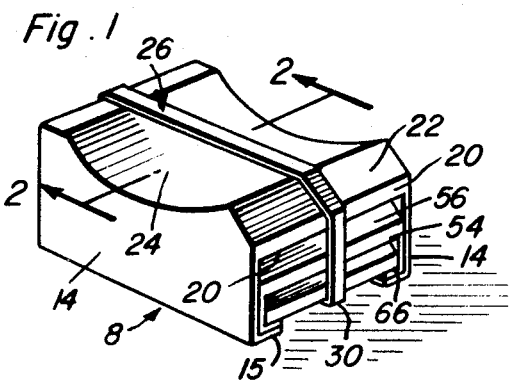
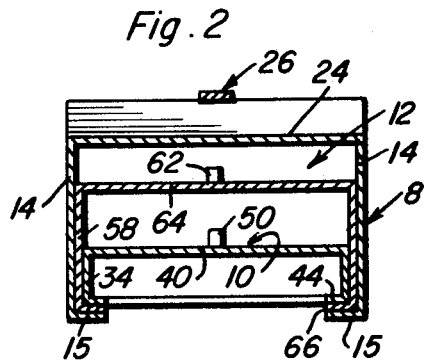
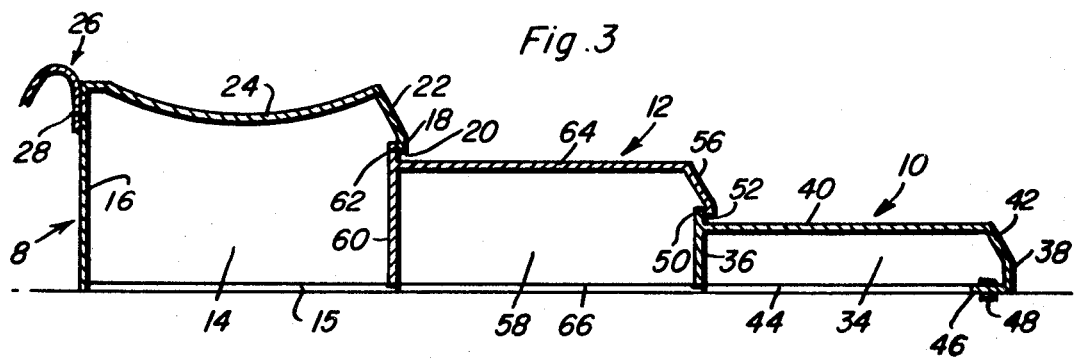
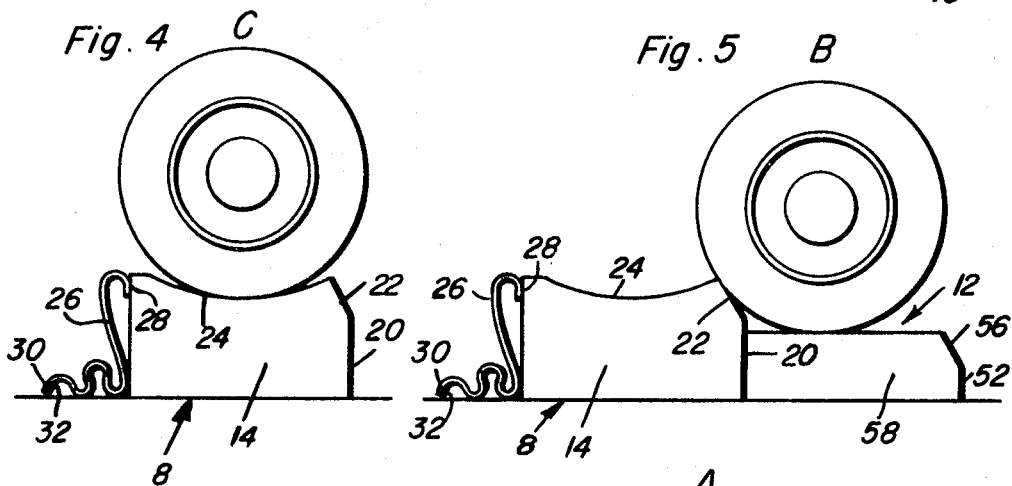
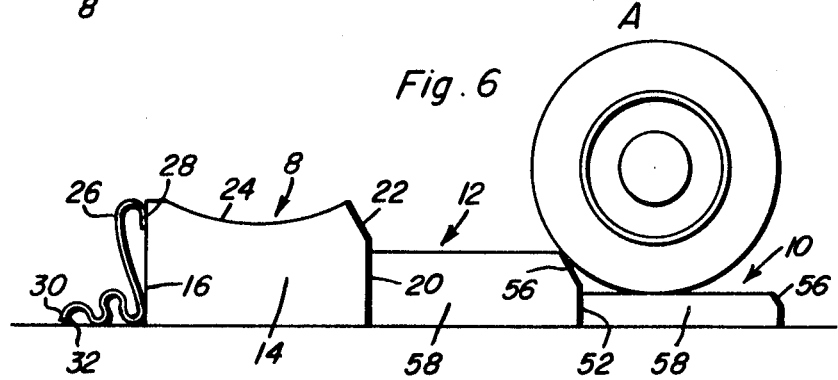

VEHICLE WHEEL ELEVATING AND LEVELING DEVICE

This invention relates to vehicle wheel lifting, elevating and temporary seating devices and has to do, more particularly, with a portable step-type adaptation which is reliably useful when it is employed to elevate, level and chock a camper wheel whenever and wherever necessary or desired.

A survey of the prior art will reveal that stepped wheel elevating devices and inclined wheel elevating adaptations with wheel perching features are not new. For background purposes reference, if desired, can be accorded the inclined seat-equipped ramp employed as a vehicle elevator in a patent to Cleave M. Au-Miller U.S. Pat. No. 1,448,250. With respect to an adaptation serving as a ramp and automobile support and because it is made up of separable and connectible block-like sections, attention is invited to the George W. Cook U.S. Pat. No. 1,493,475.

An object of the present invention, generally stated, is to advance the art of ramp-type elevating devices and, in so doing, to provide a simple practical and easy-to-use device featuring extendible and retractible step-like sections which coordinate in providing an adaptation which well serves the purposes for which it has been devised and used.

Briefly, the herein disclosed leveler lends itself to expeditious and reliable use as a camper wheel elevating, leveling and chocking device. It is characterized by a plurality of individual step-like sections arranged and coordinated in end-to-end alignment. These sections are hollow and block-like in construction and are telescopingly united and capable of being extended into use and collapsed and compactly retracted for convenient handling and storage when desired.

Each rigid but light-weight section embodies a walled base portion which functions as a riser and which embodies a complemental top wall or platform portion which constitutes a wheel seating tread. Several such sections are preferably but not necessarily used and constitute graduated selectively usable steps. The highest section has a concave arcuately contoured wheel seating chock which prevents the camper wheel from rolling off or down a slope. The open bottom flanged portions of the respective sections can be nested with the sections collapsed or stacked. On the other hand when the sections are extended, the coordinating flanges are coplaner and flush to achieve the desired supporting result.

Experience has shown that this unique leveler when in use and not exceeding its height capacity will level a camper to a maximum of three-fourths inches, more or less, from wheel to wheel, thus leveling the camper where stabilizing jacks will not be overloaded. The invention obviates the need of having to lift a wheel off the ground for camper leveling purposes. Then too a truck camper can be leveled by using two like devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a vehicle wheel elevating and leveling, chocking device constructed in accordance with the principles of the invention and showing the step-like sections folded or collapsed and further showing an optionally usable strap which when its free end is snapped in place serves to maintain the sections in nested relationship.

FIG. 2 is a cross section taken approximately on the plane of the line 2—2 of FIG. 1 looking in the direction of the indicating arrows.

FIG. 3 is a central longitudinal sectional view of the device with the several step-like sections extended for selective use.

FIG. 4 is a view in elevation with the several sections nested or collapsed and showing how the concave top wall is used as a chock for the seated camper wheel.

FIG. 5 is a view similar to FIG. 4 but showing two of the sections coordinated for use with the section at the right being used to support and retain the seated camper or equivalent wheel.

FIG. 6 is a view also in side elevation and on a suitably proportioned scale and wherein all three sections extended and seated in a common plane on the surface with the step section at the right supporting and chocking the wheel seated thereon.

The camper wheel elevating, leveling and chocking device comprises several individual but companion step-like sections, namely a first relatively high end section 8, a second relatively low end section 10 and an intervening third section 12 which when in use is situated between the first and second sections and is appropriately graduated in height so that it is lower in height than the first section 8 and higher in height than the second section 10. All three sections are hollow rectangular in plan and accordingly box-like in construction. Then too, each section is basically the same in construction in that it is characterized by a walled base and a horizontal top wall constituting a platform. The section 8 for example in FIG. 3 comprises vertical side walls 14, a back wall 16, these several walls being imperforate, and cooperating with a front wall 18 having an opening 20 of suitable shape and size and whose upper portion is beveled or sloped as at 22 to provide a chock shoulder when the device is used in the manner shown in FIG. 5 for example. The horizontal top wall is concave and provides a platform 24, more particularly, a wheel seating and chocking platform which functions in the manner shown in FIG. 4 for example. An assembling and retaining strap of requisite length and material is employed and is denoted generally in FIG. 1 by the numeral 26. One end portion is riveted at 28 to the back wall 16, the other end portion being free as at 30 and provided with a snap fastener 32.

The step section to the right for example in FIGS. 3 and 6, that is section 10, is structurally like the other two sections and here again the side walls 34, back wall 36, and front wall 38 coordinate in providing a riser type base of requisite vertical height. Here the horizontal top wall is flat as at 40 and the front wall embodies an outwardly and downwardly sloping portion 42 (FIG. 3) which constitutes a limit stop shoulder and also as a partial ramp in assisting and enabling the user to back on the device or drive on the same whichever is most practical under the circumstances. The open bottom of this section 10 is provided with side flanges as at 44 which cooperate with the similar side flanges 15 on the step section 8. In addition there is another toed-in flange as at 46 which is joined with the front wall and which is provided with snap fastener means 48 for retention (not detailed) the aforementioned male snap fastener 32. The extended member 50 at the left in FIG. 4 constitutes a limit stop lug. Thus the lug end portion is alignable with the opening means 52 in the front wall 54 of the third or intermediate step section 12. This front wall 54 is also provided with an upper corner portion which is sloped outwardly and downwardly as at 56 to provide another limit stop shoulder which comes into play in the manner shown in FIG. 5 when the camper wheel is coordinated therewith. In this section the vertical side walls are denoted at 58, the back wall at 60 and the upstanding lug at 62 (FIG. 3). The flat top wall or platform is denoted at 64 and the bottom laterally turned-in flanges are denoted at 66. This wall arrangement provides the desired riser or base. The left hand lugged end portion of the section 12 is cooperable with the aforementioned opening means 20 and the several sections can be nested or collapsed in telescoping relationship when not is use as shown in FIGS. 1, 2 and 4. The flanges 15, 66 and 44 are nested together in properly coordinating relation when the several sections are collapsed or telescoped for handling and storage as shown in FIG. 1 at which time the strap means 26 is snapped in place in a self evident manner to maintain the sections collapsed. It will be evident too that the median portion of the strap is stretched across the concave seat 24 which enables this portion of the strap to be grasped and used as a carrying handle. Thus the concave wall 24 serves not only as a chock but as a clearance surface for the overlying portion of the carrying strap.

FIG. 1 shows the telescoping, nesting and stacking feature and also emphasizes the use of the assembling and carrying strap. FIG. 3 shows the construction of the individual step sections 8, 10 and 12 and also brings out the manner in which the lug-equipped walls cooperate in holding the sections in extended usable relationship. FIG. 4 shows the camper wheel C seated and chocked to avoid displacement. FIG. 5 shows the camper wheel B seated on the intermediate step section 12 with the sloping shoulder 22 coming into play to assist in maintaining the wheel in a chocked state. FIG. 6 shows the camper wheel A seated on the lowermost step section 10 and also how the limit stop shoulder means comes into use. It follows that by obsserving these views singly and collectively in conjunction with the specification, a clear and comprehensive understanding of the invention, its mode of use and features and advantages will be evident. Accordingly, a more extended description is deemed to be unnecessary.

It is within the purview of the invention to equip the forward open bottom portion of the first relatively high end section 8 with a lateral or turned-in flange similar to the flange 46 and, if desired, to provide it with a snap fastener 48 (not illustrated) with the idea in mind that the snap fastener 32 on the free end of the strap 26 can be attached to the then present stationary snap fastener. This is to say, an alternate means of anchoring the free end of the strap (not detailed) can be employed, if so desired.

It is also within the purview of the overall concept to design, appropriate and utilize a suitable alarm system which will operate to let the user know the locale or level which the wheel has assumed. The construction and the arrangement of the details constituting such an alarm system may and will vary and is neither herein shown, described or claimed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A camper wheel elevating, leveling and chocking device comprising: a plurality of individual step-like sections, arranged in oriented alignment, said sections being telescopingly united and extended for use and collapsed and compactly retracted for convenient handling, use and storage when desired, each section embodying a base portion constituting a riser and embodying a complemental platform portion constituting a wheel seating tread, said sections being graduated in vertical height for selective wheel supporting use, said sections being hollow and box-like in construction, the base portion of each section embodying interconnected vertical walls marginally joined with and supporting a complemental horizontal wall constituting a wheel seating platform, the lower edge portions of opposed vertical side walls being provided with turned-in coplanar horizontal surface contacting flanges, the flanges carried by the respective sections being alike in construction coordinate in a common horizontal plane when the sections are extended to wheel accommodating and supporting relationship.

2. The wheel elevating, leveling and chocking device defined in and according to claim 1, and wherein the platform portion of one of said sections is arcuately contoured to provide a concave nesting and retaining chock for the wheel which is caused to be seated therein.

3. The wheel elevating, leveling and chocking device defined in and according to claim 2, and, in combination, a section embracing strap having one end anchored on said one section and bridging over said concave chock and having a free end provided with a fastener, said fastener being separably connectible with a companion fastener fixed on another one of said sections in a manner to assemble and retain the sections nested together when they are telescopingly collapsed.

4. A camper wheel elevating, leveling and chocking device comprising several individual but companion step-like sections, namely, a first relatively high end section, a second relatively low end section, and a third intervening section situated between said first and second sections and graduated in height whereby it is lower in height than the first section and higher in height than the second section, said sections being hollow, rectangular in plan, and accordingly box-like in construction, said third section being proportioned and capable of being telescopically nested within the confines of the first section, each section embodying vertical walls defining a riser-like base and a horizontal top wall providing a platform and serving as a wheel seating tread, the lower edge of the vertical side walls of said sections having lateral turned-in surface contacting flanges, said flanges, when the several sections are extended for use, being in a common supporting plane.

5. The camper wheel elevating, leveling and chocking device defined in and according to claim 4, and wherein the front walls of the base portions of the respective sections are provided with openings permitting extension and telescoping retraction of said sections, the upper corner portion of each front wall being inclined forwardly and downwardly to provide a sloping wheel ascending and descending ramp and also a limit stop shoulder for an adjacent wheel.

6. The camper wheel elevating, leveling and chocking device defined in and according to claim 5, and wherein said second and third sections are provided with upstanding stop lugs which function to check and limit the locale of said second and third sections.

7. A camper wheel elevating, leveling and chocking device comprising several individual but companion step-like sections, namely, a first relatively high end section, a second relatively low end section, and a third intervening section situated between said first and second sections and graduated in height whereby it is lower in height than the first section and higher in height than the second section, said sections being hollow, said third section being proportioned and telescopingly nested within the confines of the first section, each section embodying vertical walls defining a riser-like base and a horizontal top wall providing a platform and serving as a wheel seating tread, the lower edge of the vertical side walls of said sections having lateral turned-in surface contacting flanges.

* * * * *